No. 779,990. PATENTED JAN. 10, 1905.
A. L. CHRISTENSON.
CENTRIFUGAL LIQUID SEPARATOR.
APPLICATION FILED OCT. 6, 1903.

3 SHEETS—SHEET 1.

Witnesses
Evald Delmar
Gerda Lindkvist.

Inventor
Algot L. Christenson
by Olsham
his att'y

No. 779,990.

Patented January 10, 1905.

UNITED STATES PATENT OFFICE.

ALGOT LEVIN CHRISTENSON, OF STOCKHOLM, SWEDEN.

CENTRIFUGAL LIQUID-SEPARATOR.

SPECIFICATION forming part of Letters Patent No. 779,990, dated January 10, 1905.

Application filed October 6, 1903. Serial No. 176,017.

*To all whom it may concern:*

Be it known that I, ALGOT LEVIN CHRISTENSON, a subject of the King of Sweden and Norway, and a resident of Stockholm, Sweden, have invented a new and useful Improvement in Liners for Centrifugal Separators, of which the following is a specification, reference being had to the drawings accompanying and forming a part hereof.

This invention relates to improvements in liners for centrifugal separators, and more especially to such liners which radially divide the contents of the bowl into thin layers and are provided with inlet devices which lead the full milk through the wall of cream obtained in the bowl during the rotation of the same. The said inlet devices may be in the shape of radially-extending flanges or wings provided on the usual central inlet-pipe and having outlet-openings in the shape of longitudinally-running slots or small holes, or the said inlet devices may be in the shape of channels and provided on the plates or the like, forming the liner, and so on.

The object of the invention is to provide means for preventing the cream layers flowing toward the center of the bowl from entering the said inlet devices in order to obviate the mixing of the said cream with the full milk let in through the said devices.

The invention consists, briefly, in the combination, with a liner of the class set forth, of obstacles, guides, or the like constructed and arranged in such manner as to prevent the cream layers flowing toward the center of the bowl from entering the above-mentioned inlet devices.

In the accompanying drawings I have shown some liners embodying my invention.

Figure 1:
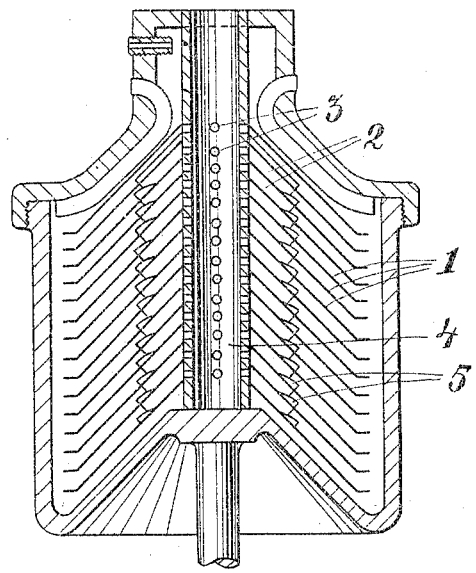
Figure 2:
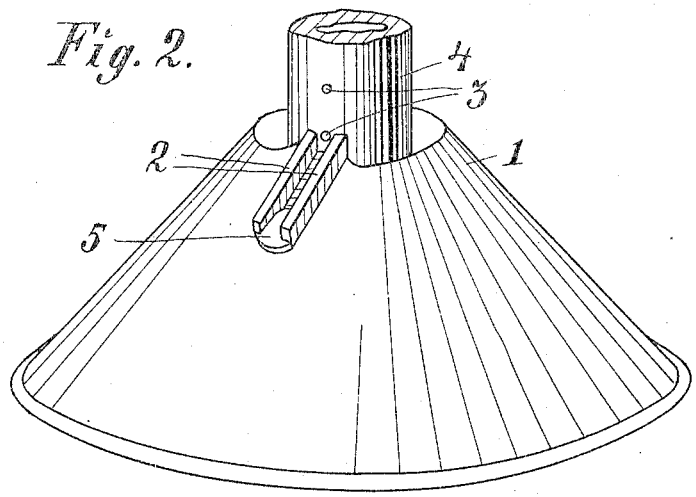
Figure 3:
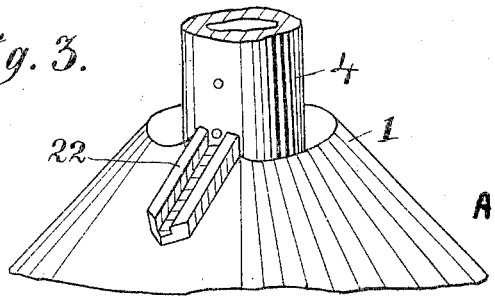
Figure 4:
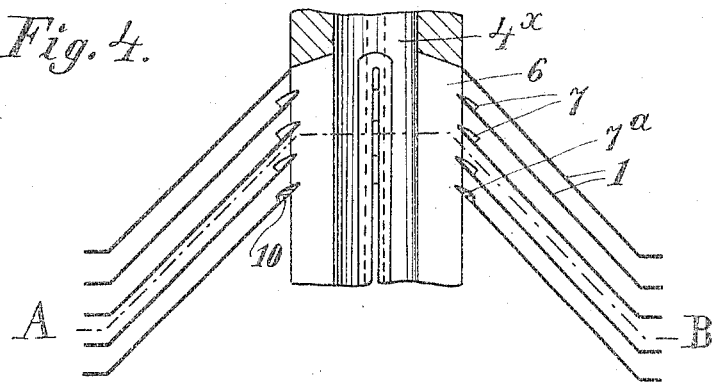
Figure 5:
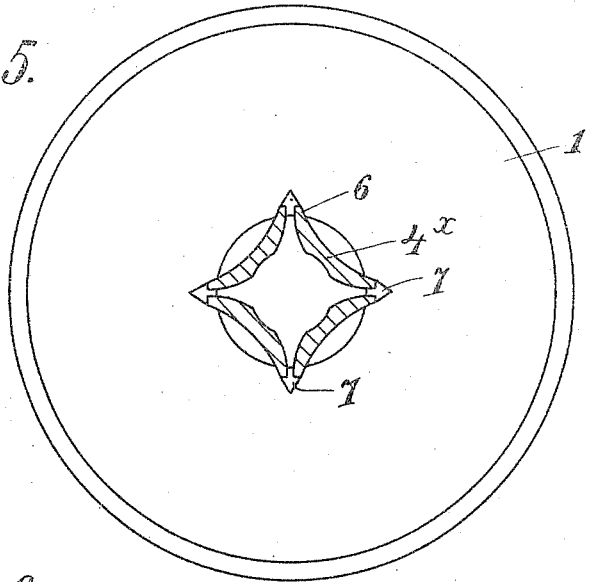
Figure 6:
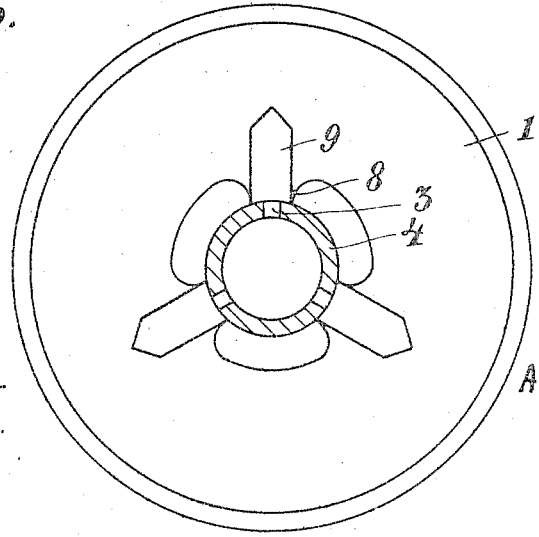
Figure 7:
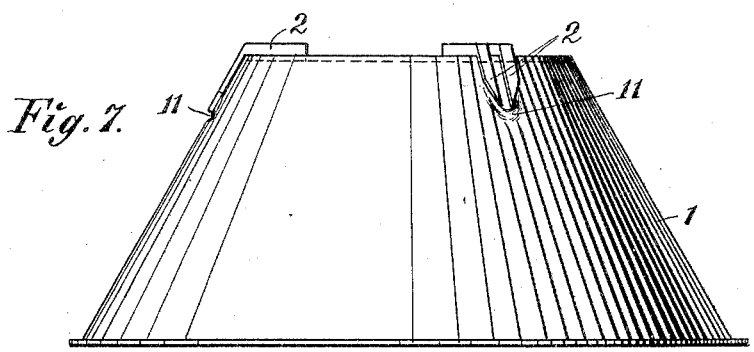
Figure 8:
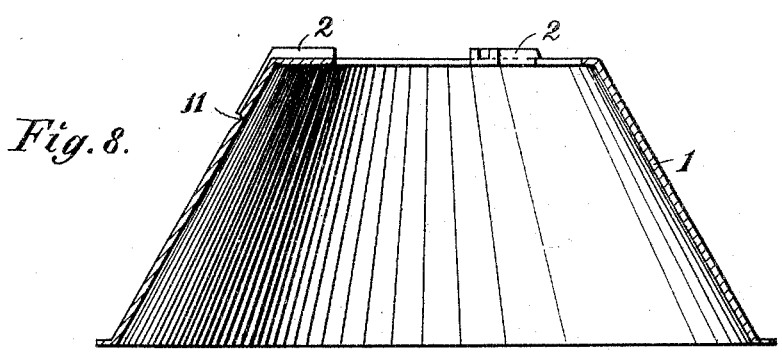

Figures 1 and 2 illustrate the application of my invention to a liner consisting of conical ring-shaped plates, which are provided in well-known manner with inlet-channels for the full milk. Fig. 1 is a section of a centrifugal separator-drum with such a liner; and Fig. 2 shows, on a larger scale, a perspective view of one of the said conical plates. Fig. 3 shows a modification of the device illustrated in Figs. 1 and 2. Figs. 4 and 5 illustrate the application of my invention to a liner likewise consisting of conical ring-shaped plates superposed on one another, in which liner the full milk is let through the wall of cream by means of radial flanges projecting from the central inlet-pipe. Fig. 4 is a vertical cross-section of a part of such a liner, and Fig. 5 a section on line A B of Fig. 4. Fig. 6 illustrates in plan view a third way of carrying out the invention. Figs. 7 and 8 are side elevation and vertical cross-section of a conical plate illustrating a modification of the device shown in Figs. 1 and 2.

Referring to Figs. 1 and 2, the plates 1 are in well-known manner provided with small metal bands 2 or the like, soldered or fixed in any other manner to the plates and forming radially or approximately radially running channels through which the full milk thrown out through the holes 3 of the central inlet-pipe 4 is let through the wall of cream obtained during the separation process. The arrangement which in these channels prevents the cream flowing inward on the outside of each plate 1 from entering the said channels consists of a piece of metal 5 or any other suitable material, filling up the lower part of the outer mouth of each channel. The inner end of the said metal piece (the end directed toward the central inlet-pipe) may preferably be wedge-shaped in the manner illustrated in Fig. 1 in order to offer the smallest possible hindrance against the outflow of the full milk. The outer end of the said metal piece 5 may preferably extend sidewise to the outer edges of the said metal bands 2 and be curved or wedge-shaped, as clearly shown in Fig. 2, so that the cream particles striking the same may be easily led to the sides. The said metal piece 5 may also extend through the whole length of the channel. In such case the channel may preferably be made of a single metal band 22, as shown in Fig. 3, in which the channel is cut or pressed by any suitable means in such manner that a bottom of suitable thickness is obtained. The outer end of the metal band 22 may be curved or wedge-shaped for the purpose set forth with reference to the metal piece 5.

In the liner shown in Figs. 4 and 5 the central inlet-pipe $4^{\times}$ is in well-known manner provided with radially-projecting flanges 6, having longitudinally-running slots through which the full milk is thrown out and engaging corresponding recesses in the inner edges of the plates 1, as shown in Fig. 5. The latter are opposite the said slots provided with pieces 7, of metal or any other suitable material, fixed in any suitable manner thereto and preferably reaching into the said slots, as shown in Figs. 4 and 5. The said pieces 7 work in the same manner as the above described pieces 5—i. e., prevent the cream layers flowing inward on the upper side of each plate 1 from entering the slots of the flanges 6.

In the arrangement illustrated in Fig. 6, in which the plates 1 are at their inner edges provided with tongues 8, projecting to the central inlet-pipe 4 and arranged opposite the outlet-holes 3, each tongue 8 is provided with a band 9 of approximately the same thickness in relation to the distance between two plates 1 as the bottom of the channel shown in Fig. 3 or the metal piece 5 shown in Fig. 2. Also the said bands 9 are arranged on the upper sides of the plates.

Obviously I do not limit myself to the shape of the obstacles described above and shown in the accompanying drawings, inasmuch as the shape of the same may be varied to correspond to the construction of the liner in which they are to be used. For the said metal pieces or the like corresponding depressions or the like may, as is easily understood, be substituted as shown at 7ª in Fig. 4. In such case the cavity of the said depressions may preferably be filled up by a suitable material, such as soldering metal or the like, as shown at 10 in Fig. 4, in order to obviate any disturbing effect of the said cavities. Instead of the obstacles or guides described channels 11 may be arranged in the upper sides of the conical plates 1 in front of the inlets 2 for the full milk, so that the cream will thereby be led past the said inlet, as shown in Figs. 7 and 8.

Having now described my invention and in what manner the same may be performed, what I claim as new, and desire to secure by Letters Patent, is—

1. The combination with a centrifugal separator-bowl having a liner which radially divides the contents of the bowl into thin layers and means for conducting the full milk through the wall of cream obtained in the separation process, of means for preventing the cream layers flowing toward the center of the said bowl from entering the said conducting means for the full milk, substantially as and for the purpose set forth.

2. The combination with a centrifugal separator-bowl having a liner consisting of conical plates superposed on one another and a central inlet-pipe provided with flanges adapted to conduct the full milk through the wall of cream obtained in the separation process, of metal pieces attached to the said plates in front of the outlet-openings of the said flanges, substantially as and for the purpose set forth.

In testimony whereof I have signed my name to this specification in the presence of two subscribing witnesses.

ALGOT LEVIN CHRISTENSON.

Witnesses:
EWALD DELMAR,
JOHN DELMAR.